United States Patent [19]

Schroeder et al.

[11] Patent Number: 5,660,307

[45] Date of Patent: Aug. 26, 1997

[54] ICE DISPENSER AND COMBINATION ICE AND BEVERAGE DISPENSER

[75] Inventors: Alfred A. Schroeder; Bennet Gibbon Credle; Richard Logue Laughlin, all of San Antonio, Tex.

[73] Assignee: Lancer Corporation

[21] Appl. No.: 787,811

[22] Filed: Jan. 23, 1997

Related U.S. Application Data

[60] Continuation of Ser. No. 590,790, Jan. 24, 1996, abandoned, which is a division of Ser. No. 388,739, Feb. 15, 1995.

[51] Int. Cl.⁶ .................................................. B67D 1/16
[52] U.S. Cl. .......................... 222/108; 141/87; 137/313; 403/316
[58] Field of Search ........................ 222/108; 141/86, 141/87, 383; 137/312, 313, 314; 403/315, 316, 353, 386; 108/108; 312/128, 140, 402, 280, 281

[56] References Cited

U.S. PATENT DOCUMENTS

| | | | |
|---|---|---|---|
| 163,481 | 5/1875 | Gray | 222/108 |
| 215,016 | 5/1879 | Mattee | 222/108 |
| 1,256,206 | 2/1918 | Cordley | 222/108 |
| 2,639,042 | 6/1953 | Lambert et al. | 403/353 X |
| 3,327,902 | 6/1967 | Alterwitz | 222/108 |
| 3,469,711 | 9/1969 | Swaneck et al. | 108/108 X |
| 4,126,208 | 11/1978 | McVeen | 403/315 X |
| 4,782,667 | 11/1988 | Kito et al. | 222/108 X |
| 4,865,225 | 9/1989 | Chavez et al. | 222/108 |
| 5,063,977 | 11/1991 | Belland | 222/108 X |
| 5,129,547 | 7/1992 | Fisher et al. | 222/108 X |
| 5,285,989 | 2/1994 | Zilbert et al. | 222/108 X |
| 5,339,676 | 8/1994 | Johnson | 141/86 X |
| 5,356,106 | 10/1994 | Trotta et al. | 108/108 X |

*Primary Examiner*—Andres Kashnikow
*Assistant Examiner*—Kenneth Bomberg
*Attorney, Agent, or Firm*—Donald R. Comuzzi; Christopher L. Makay

[57] ABSTRACT

An apparatus for dispensing ice includes a bin and a shroud that contains a recess for housing a wheel. The shroud mounts to a front wall of the bin and includes a chute that communicates exterior to the bin. The shroud further includes a curved plate that directs ice into the recess so that the wheel can raise the ice to the chute. A plate mounts at an angle sloping downward towards the front wall of the bin to direct ice onto the curved plate of the shroud. A discharge chute assembly mounts to the ice bin and communicates with the chute of the shroud to permit the delivery of the ice exterior to the bin. A gear motor drives the wheel to facilitate the lifting of the ice to the chute of the shroud. Alternatively, in a combination ice and beverage dispenser, the plate mounted within the bin is replaced with a cold plate mounted within the bin at an angle sloping downward towards the front wall of the bin. The cold plate directs ice in the bin onto the curved plate of the shroud and communicates at inlets to a beverage source to cool beverages before dispensing. Dispensing valves communicate with outlets from the cold plate to permit the dispensing of beverages from the ice and beverage dispensing apparatus.

5 Claims, 8 Drawing Sheets

ICE DISPENSER AND COMBINATION ICE AND BEVERAGE DISPENSER

This application is a continuation of application Ser. No. 08/590,790, filed on Jan. 24, 1996, now abandoned, which was a divisional of application Ser. No. 08/388,739, filed Feb. 15, 1995, pending.

BACKGROUND OF THE INVENTION

1. Field of the Invention

The present invention relates to apparatus for dispensing both ice and beverages and, more particularly, but not by way of limitation to a beverage dispenser that includes a large ice storage capacity and an improved ice dispensing system.

2. Description of the Related Art

Available space is a valuable commodity in small convenience stores, cafeterias, concession stands, fast food service lines, and the like. Accordingly, the relevant industry sets certain ice and beverage dispenser size and dimensional requirements based on practical limitations of service counter area related to ease of everyday operation and routine maintenance. The industry is constantly looking for improved apparatus that take up less counter space while delivering the same or increased levels of efficiency. Consequently, small compact machines facilitating the delivery of food service and suitable for service counters of set and limited dimensions are constantly in demand.

U.S. Pat. No. 4,930,685 issued Jun. 5, 1990 to Landers discloses an ice dispenser. The ice dispenser includes an ice bin having an inward and rearward sloped front wall and forward sloped semi-cylindrical bottom wall. A paddle wheel is positioned in a recess in the sloping front wall. The paddle wheel includes a circular plate lying along a central portion of the annular recess. The paddle wheel further includes a truncated conical plate converging from the circular plate and paddles extending radially from the conical plate. As the paddle wheel rotates, ice entering the recess from the ice bin is lifted to a discharge chute communicating with the recess.

With both ice and chilled beverages becoming a necessary part of modern day food service, combined ice and chilled beverage dispensers are desirable because they logically increase efficiency by eliminating the need for two separate machines thereby making more counter space available. U.S. Pat. No. 5,104,007 issued Apr. 14, 1992 to Utter discloses one such design. Utter discloses an ice handling and beverage dispenser including an agitator assembly mounted within a downwardly sloping ice storage bin. The assembly includes a rotor connected to an agitator that contains a frame to sweep the ice. The rotor includes a plurality of circumferentially arranged L-shaped ice moving scoops. A motor rotatable drives the agitator assembly whereby the scoops lift ice from a location adjacent the of the bin to an outlet chute thereabove.

Although both Landers and Utter operate satisfactorily, they both suffer from several disadvantages. Landers includes only an ice dispenser and, therefore, does not save counter space because a separate beverage dispenser is required. Additionally, both Landers and Utter utilize two ice compartments; a first for storing potable ice and a second for storing ice used to cool the cold plate. That configuration is inefficient because the division of the ice restricts the supply of both potable ice and ice used to cool the cold plate.

Applicant's U.S. Pat. No. 5,054,654 issued Oct. 8, 1991 to Schroeder, et al. discloses an alternative combination ice and beverage dispenser. Schroeder et al. disclose an ice storage and dispensing system utilizing a circular rotating tray and an intermediate cone chute to dispense ice efficiently in combination with chilled beverage dispensing.

A highly desirable combination ice and beverage dispenser would provide only one large storage compartment and a unique means for directing ice to the lowest end of a paddle wheel located within the ice compartment. Such a design would almost double the capacity of potable ice storage as compared to the dispensers disclosed in the aforementioned patents.

SUMMARY OF THE INVENTION

In accordance with the present invention, an apparatus for dispensing ice includes a bin and a shroud that contains a recess for housing a wheel. The shroud mounts to a front wall of the bin and includes a chute that communicates exterior to the bin. The shroud further includes a curved plate that directs ice into the recess so that the wheel can raise the ice to the chute. A plate mounts at an angle sloping downward towards the front wall of the bin to direct ice onto the curved plate of the shroud. A discharge chute assembly mounts to the ice bin and communicates with the chute of the shroud to permit the delivery of the ice exterior to the bin. A gear motor drives the wheel to facilitate the lifting of the ice to the chute of the shroud.

In the combination ice and beverage dispenser, the plate mounted within the bin is replaced with a cold plate mounted within the bin at an angle sloping downward towards the front wall of the bin. The cold plate slopes at the downward angle to direct ice in the bin onto the curved plate of the shroud. Furthermore, the cold plate communicates at inlets to a beverage source to cool beverages before dispensing. Dispensing valves communicate with outlets from the cold plate to permit the dispensing of beverages from the ice and beverage dispensing apparatus.

It is, therefore, an object of the present invention to provide an ice dispenser with a shroud housing a dispensing wheel that delivers ice to a discharge chute of the ice dispenser.

It is another object of the present invention to provide an enlarged ice storage bin in combination with an ice and beverage dispenser.

It is a further object of the present invention to provide an ice dispenser that not only includes a large storage capacity of potable ice but which also maximizes the amount or volume of ice that covers the cold plate to ensure that the beverage lines embedded in the cold plate are maintained at the proper temperature.

Still other objects features, and advantages of the present invention will become evident to those skilled in the art in light of the following.

DETAILED DESCRIPTION OF THE PREFERRED EMBODIMENT

Figure 1:
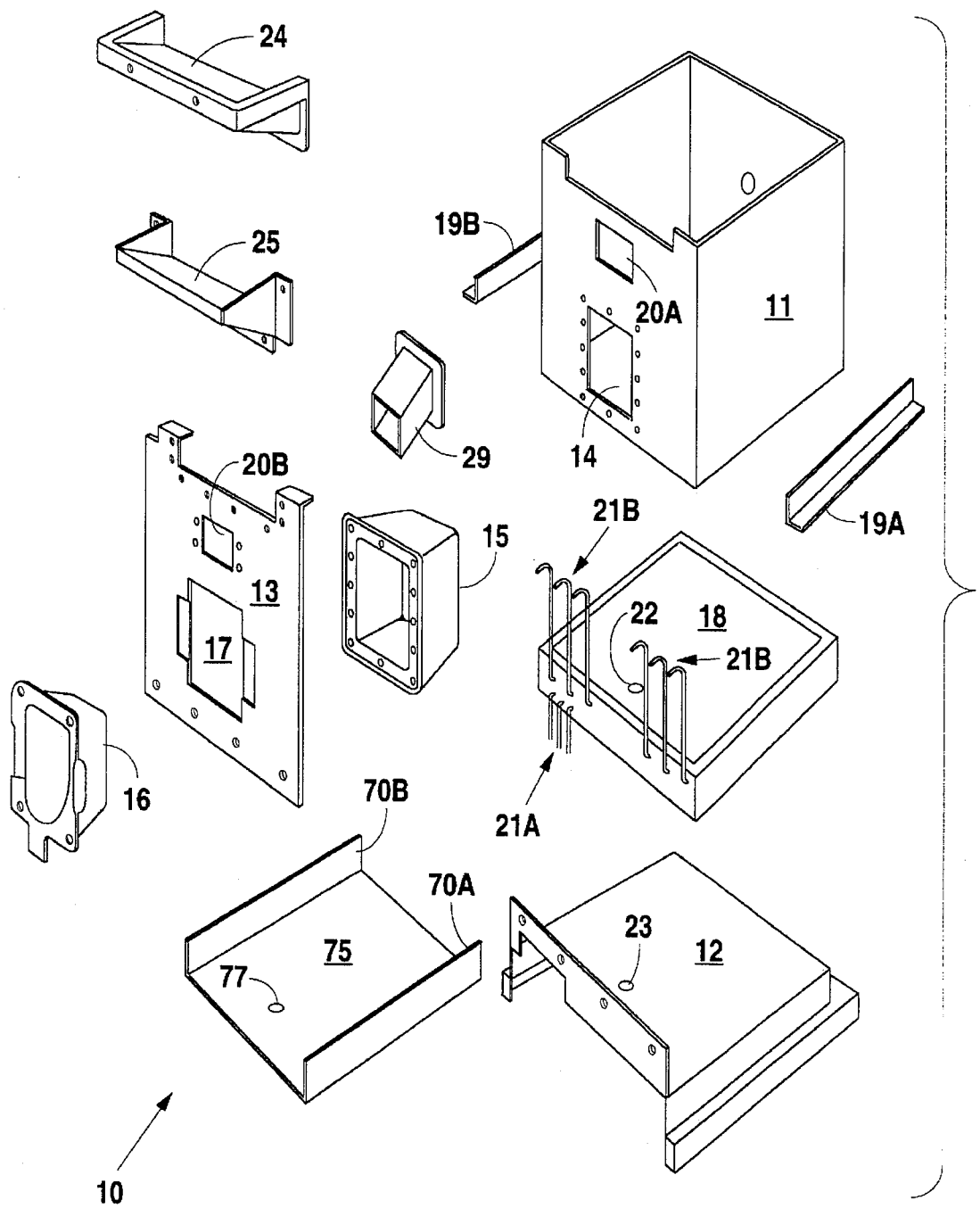
FIG. 1 is an exploded perspective view illustrating the assembly of the bin liner for either the ice dispenser or combination ice and beverage dispenser.
Figure 7:
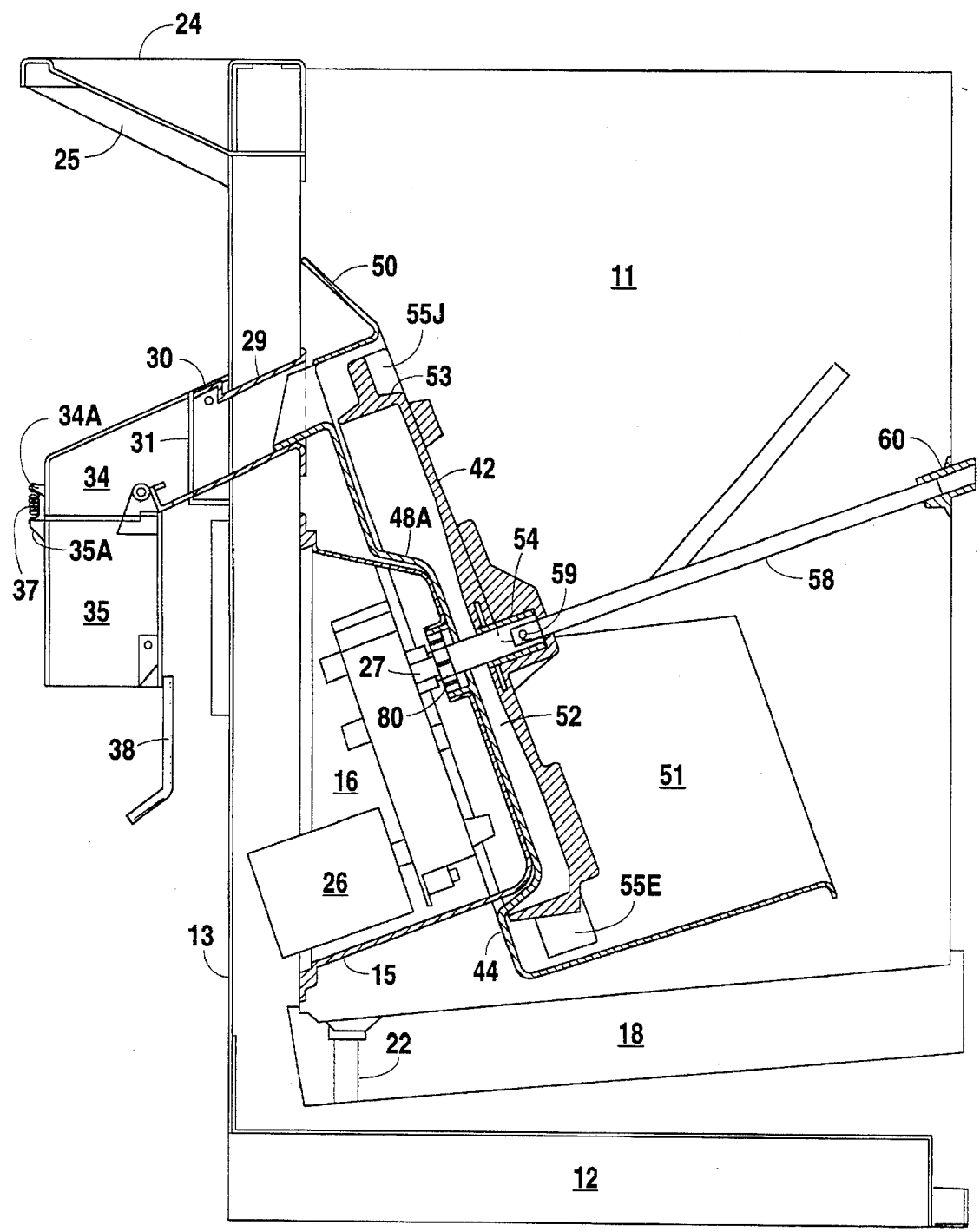
FIG. 7 is a side plan view in cross-section illustrating a partially assembled combination ice and beverage dispenser.

As illustrated in FIGS. 1 and 7, dispensing apparatus 10 includes liner 11, base 12, and mounting plate 13. Mounting plate 13 connects to base 12 using any suitable means such as screws or nuts and bolts. Liner 11 includes opening 14 to receive shroud 15 therein. Shroud 15 mounts to liner 11 using any suitable means such as screws or nuts and bolts. Insert shroud 16 resides within shroud 15 and their attachment permits the mounting of liner 11 onto mounting plate 13. Although liner 11 mounts onto mounting plate 13, shroud 15 spaces liner 11 and mounting plate 13 apart to create a gap therebetween that holds insulating foam. Once shroud 15 has been secured in opening 14, mounting plate 13 is placed against shroud 15 followed by the placement of insert shroud 16 through opening 17 into shroud 15. Insert shroud 16 is then secured to shroud 15 using any suitable means such as screws or nuts and bolts to affix liner 11, shroud 15, mounting plate 13, and insert shroud 16 together.

Dispensing apparatus 10 includes chute 29 to provide a discharge passageway. Consequently, chute 29 spans the gap between liner 11 and mounting plate 13 to permit the communication of ice exterior to dispensing apparatus 10. Chute 29 fits through opening 20A of liner 11 and opening 20B of mounting plate 13. Chute 29 includes a lip that abuts the interior of liner 11 about opening 20A to prevent the dislodging of chute 29 from within openings 20A and B.

If dispensing apparatus 10 dispenses only ice, it includes plate 75 having sides 70A and B. Sides, 70A and B attach to liner using any suitable attachment means such as screws or nuts and bolts to secure plate 75 within liner 11 the sidewalls of liner 11 slope downwardly from the rear wall to the front wall so that the connection of plate 75 to liner 11 results in plate 75 residing at an angle sloping toward the front wall of liner 11. Plate 75 resides at an angle sloping toward the front wall of liner 11 (approximately 5 degrees in this preferred embodiment) to facilitate the drainage of water off plate 75. Furthermore, plate 75 includes drain hole 77 that communicates with drain hole 23 of base 12 so that any water accumulating on plate 75 may be drained from dispensing apparatus 10.

If dispensing apparatus 10 dispenses both ice and beverages, plate 75 is replaced with cold plate 18. Cold plate 18 is a standard cold plate including inlet lines 21A that connect to a beverage source and outlet lines 21B that connect to dispensing valves to allow the dispensing of beverages. Cold plate 18 attaches to liner 11 using brackets 19A and B and any suitable attachment means such as screws or nuts and bolts. The sidewalls of liner 11 slope downwardly from the rear wall to the front wall so that the connection of cold plate 18 to liner 11 results in cold plate 18 residing at an angle sloping toward the front wall of liner 11. Cold plate 18 resides at an angle sloping toward the front wall of liner 11 (approximately 5 degrees in this preferred embodiment) to facilitate the drainage of water off cold plate 18. Furthermore, cold plate 18 includes drain hole 22 that communicates with drain hole 23 of base 12 so that any water accumulating on cold plate 18 may be drained from dispensing apparatus 10.

Dispensing apparatus 10 includes tray 24 that connects to liner 11 using bracket 25 and any suitable attachment means such as screws or nuts and bolts. Tray 24 provides a platform that supports a container holding ice during the dumping of ice into dispensing apparatus 10.

Figure 2:
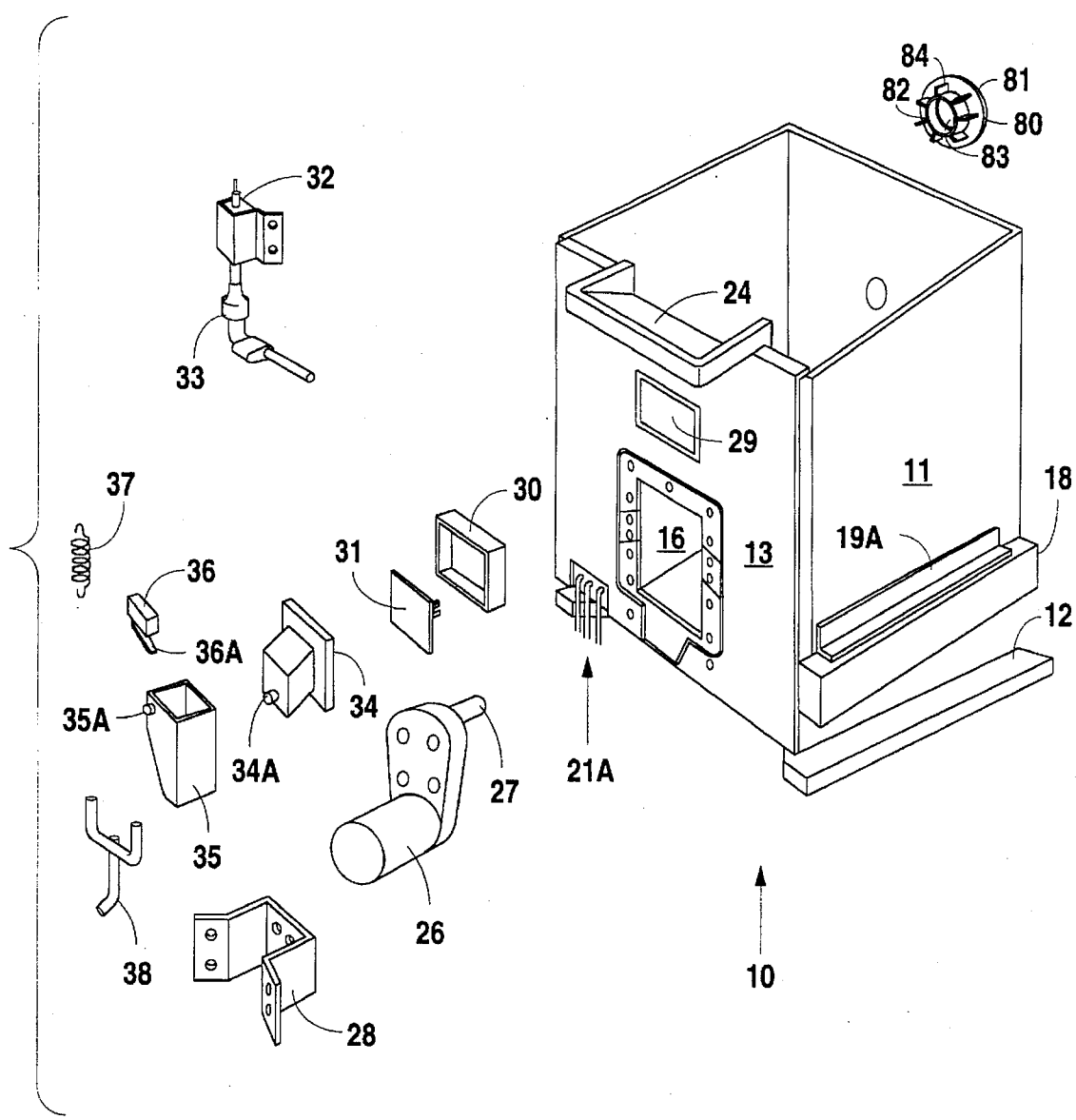
FIG. 2 is an exploded perspective view illustrating the dispensing wheel drive system.

As illustrated in FIGS. 2 and 7, dispensing apparatus includes gear motor 26 that resides in the cavity defined by insert shroud 16. Gear motor 26 mounts within insert shroud 16 using bracket 28 and any suitable attachment means such as screws or nuts and bolts. Both insert shroud 16 and shroud 15 include openings therethrough to permit shaft 27 of gear motor 26 to protrude into liner 11. A locking bearing (not shown) mounts within the openings through insert shroud 16 and shroud 15 using any suitable means such as an adhesive to provide a holder for seal 80. Seal 80 includes flange 81 and cylindrical portion 82 having opening 83 therethrough that receives shaft 27 of gear motor 26. Seal 80 includes splines 84 while the locking bearing includes matching grooves that receive splines 84 to lock seal 80 within the locking bearing. Dispensing apparatus 10 includes seal 80 to prevent water and ice from escaping liner 11 through the openings in insert shroud 16 and shroud 15 necessary to permit shaft 27 to protrude into liner 11.

Dispensing apparatus 10 includes door frame 30, door 31, chute 34, and tube chute 35 to direct ice travelling through chute 29 into a container. Door frame 30 fits within over the outlet from chute 29 and connects to mounting plate 13 using any suitable means such as screws or nuts and bolts. Door 31 pivotally attaches within door frame 30 using a pivot pin (not shown) to prevent the discharge of ice except during the activation of dispensing apparatus 10. Chute 34 fits over door frame 30 and connects to mounting plate 13 using any suitable means such screws. Tube chute 35 pivotally connects to the underside of chute 34 using brackets and pivot pins (not shown) to provide the outlet for ice discharged from dispensing apparatus 10.

Solenoid 32 attaches to mounting plate 13 using any suitable means such as screws and is coupled to door 31 via lever 33 to control the opening and closing of door 31. Switch 36 mounts to the front, of chute 34 using any suitable means such as screws to control the activation of solenoid 32 and gear motor 26. Switch 36 includes contactor 36A that abuts protrusion 35A of tube chute 35. When tube chute 35 is pivoted, protrusion 35A moves away from switch 36 thereby releasing contactor 36A which facilitates the activation of switch 36. Spring 37 connects between protrusion 34A of chute 34 and protrusion 35A of tube chute 35 to provide a restoring force against the pivoting of tube chute 35. Lever 38 mounts at the lower rear portion of tube chute 35 using any suitable means such as pins (not shown) to provide a tube chute pivot point accessible to a user.

Figure 3:
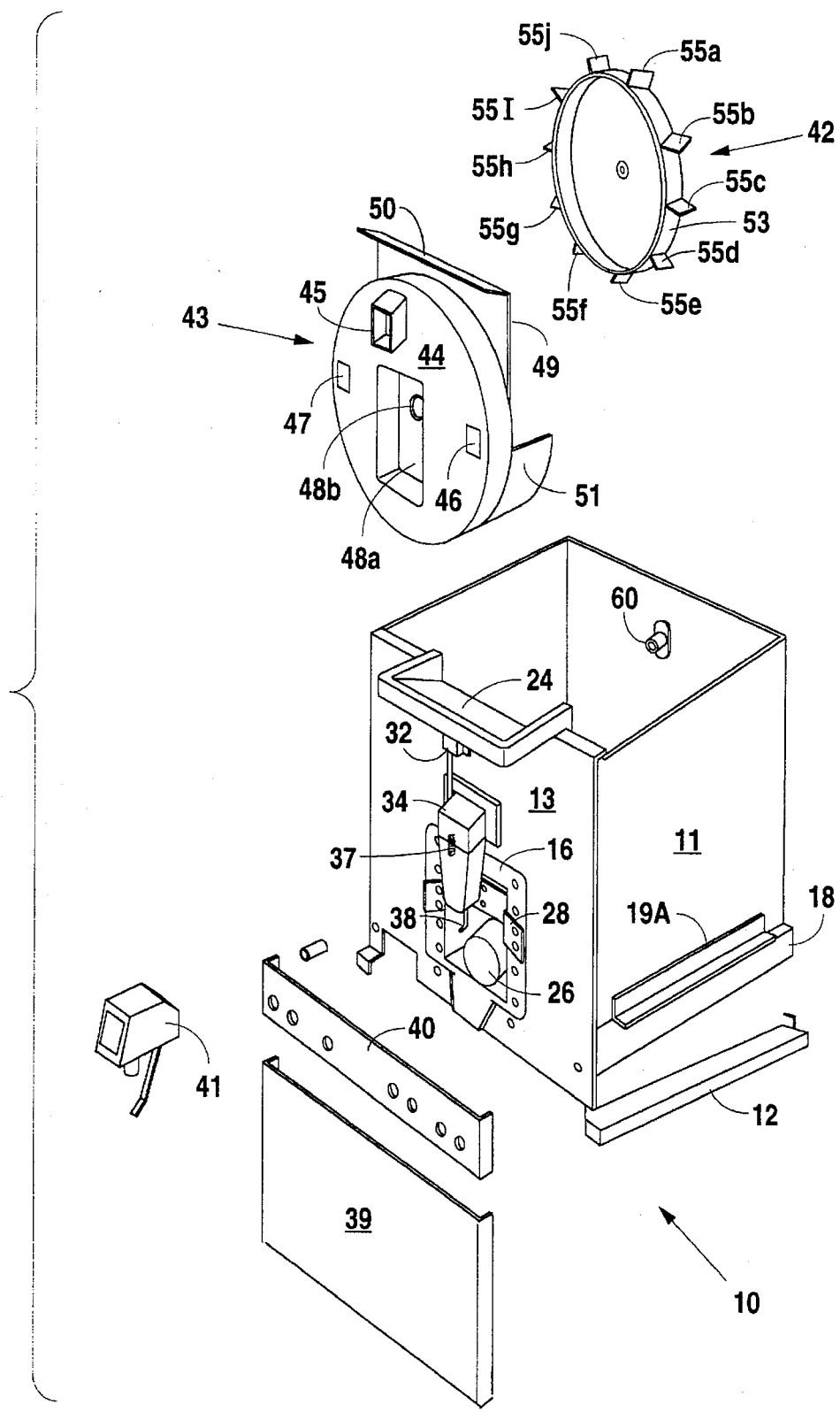
FIG. 3 is an exploded perspective view illustrating the dispensing wheel and dispensing wheel shroud.

As illustrated in FIG. 3, dispensing apparatus 10 includes splash plate 39 that attaches to wrapper 61 (see FIG. 4) using any suitable means such as screws to prevent dispensed beverages from contacting gear motor 26. Faucet plate 40 attaches to mounting plate 13 using any suitable means such as screws to provide a connection point for the dispensing valves referenced generally with numeral 41 (see FIG. 4).

Figure 8:
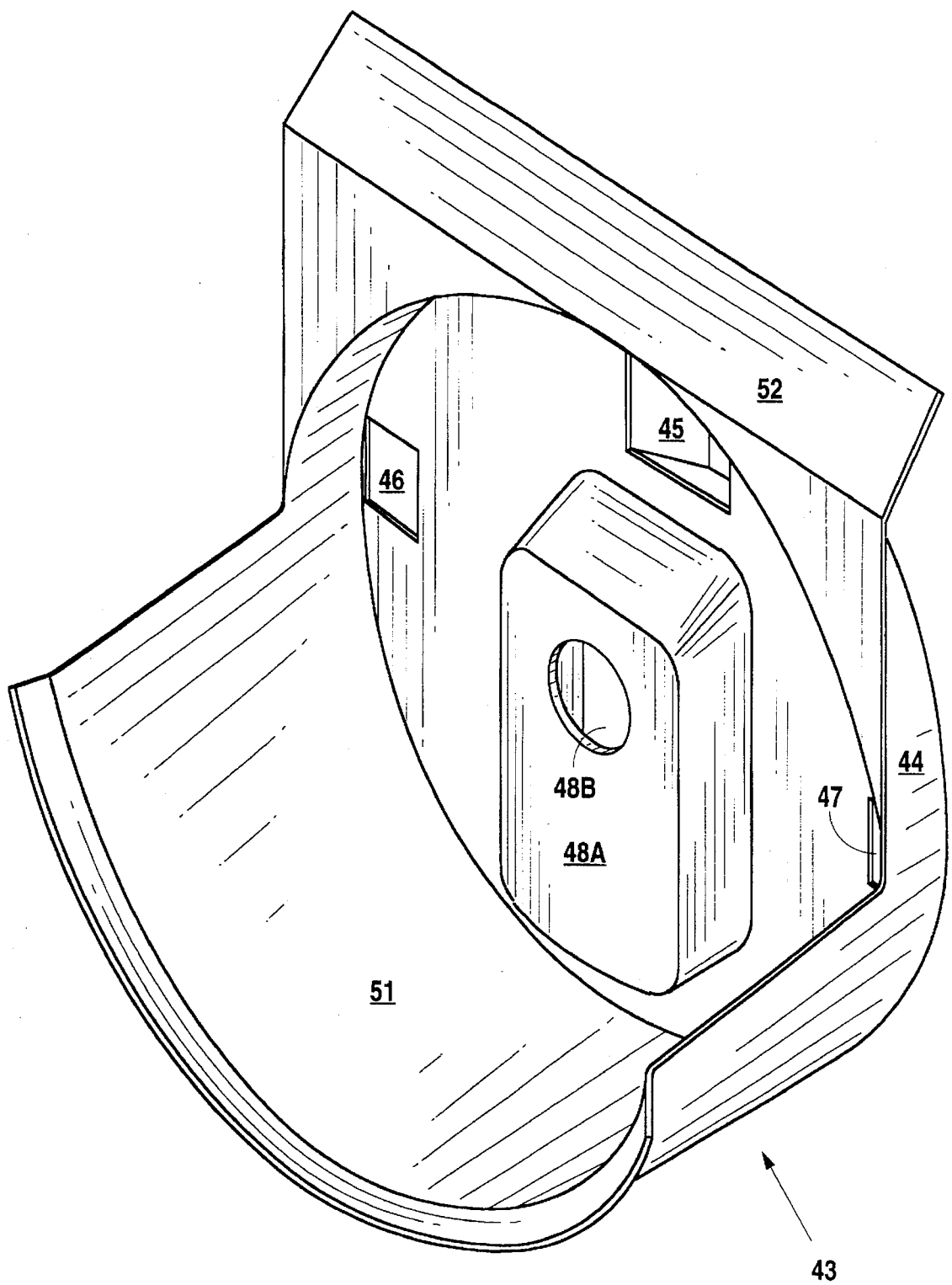
FIG. 8 is a perspective view illustrating the dispensing wheel shroud.

As illustrated in FIGS. 3, 7, and 8, dispensing apparatus 10 includes wheel 42 and shroud 43 to facilitate the dispensing of ice from dispensing apparatus 10. Shroud 43 includes cylindrical portion 44 that defines a recess in which wheel 42 resides. Cylindrical portion 44 includes chute 45 and openings 46 and 47 therethrough. Cylindrical portion 44 further includes depression 48A having opening 48B therethrough. Chute 45 and depression 48A permit the angled positioning of shroud 43 at the front wall of liner 11. Depression 48A resides around a portion of shroud 15, while chute 45 inserts into chute 29 so that shroud 43 is suspended at an angle sloping away from the top of the front wall of liner 14. Bonnet 49 extends from cylindrical portion 44 and includes lip 50 that abuts tray 24 to help support and increase the rigidity of shroud 43. Shroud 43 includes curved plate 51 extending from the lower end of cylindrical portion 44 to furnish a chute that funnels ice into the recess defined by cylindrical portion 44.

Figure 4:
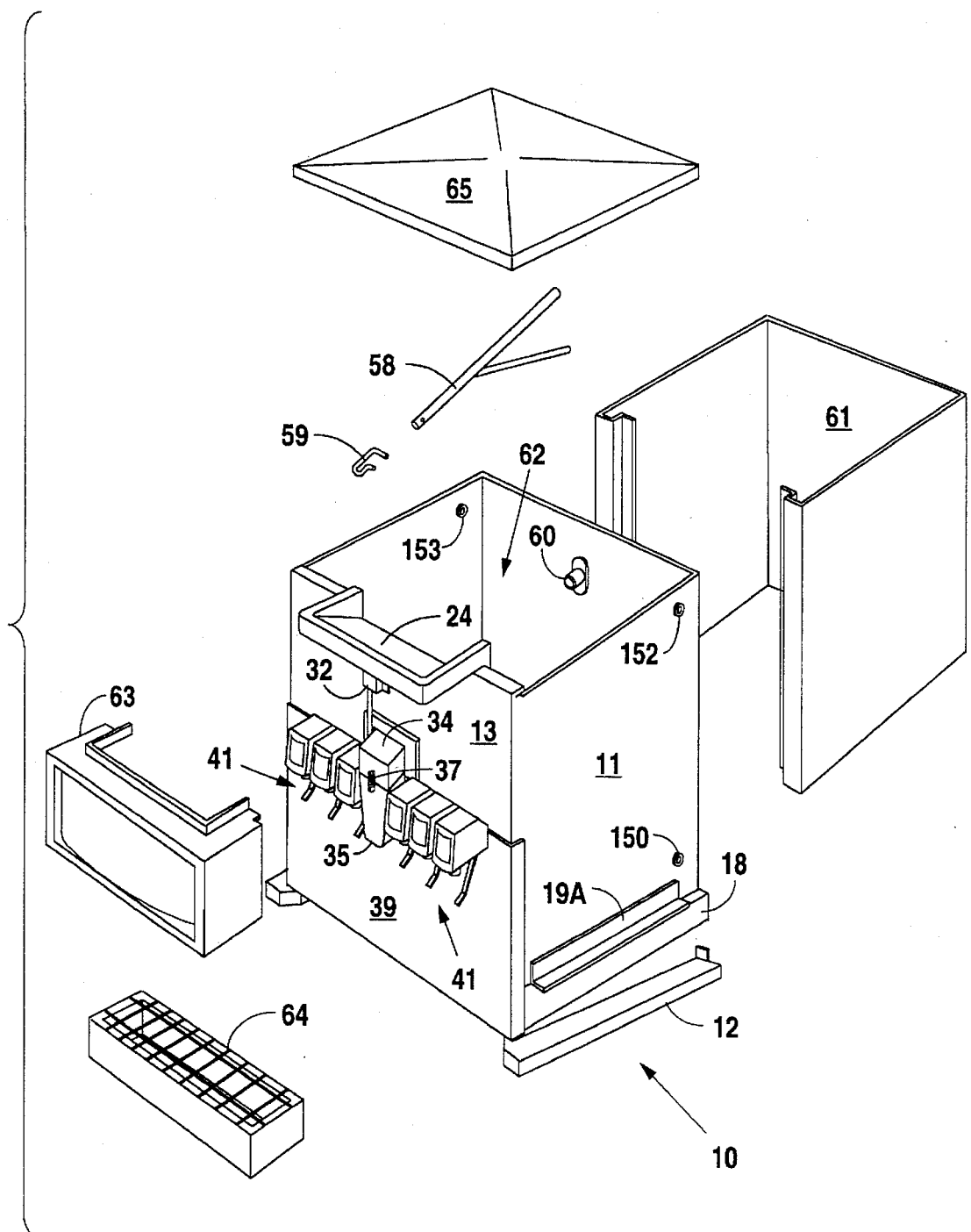
FIG. 4 is an exploded perspective view illustrating the final assembly of the ice bin and inclusion of dispensing valves for the combination ice and beverage dispenser.
Figure 5:
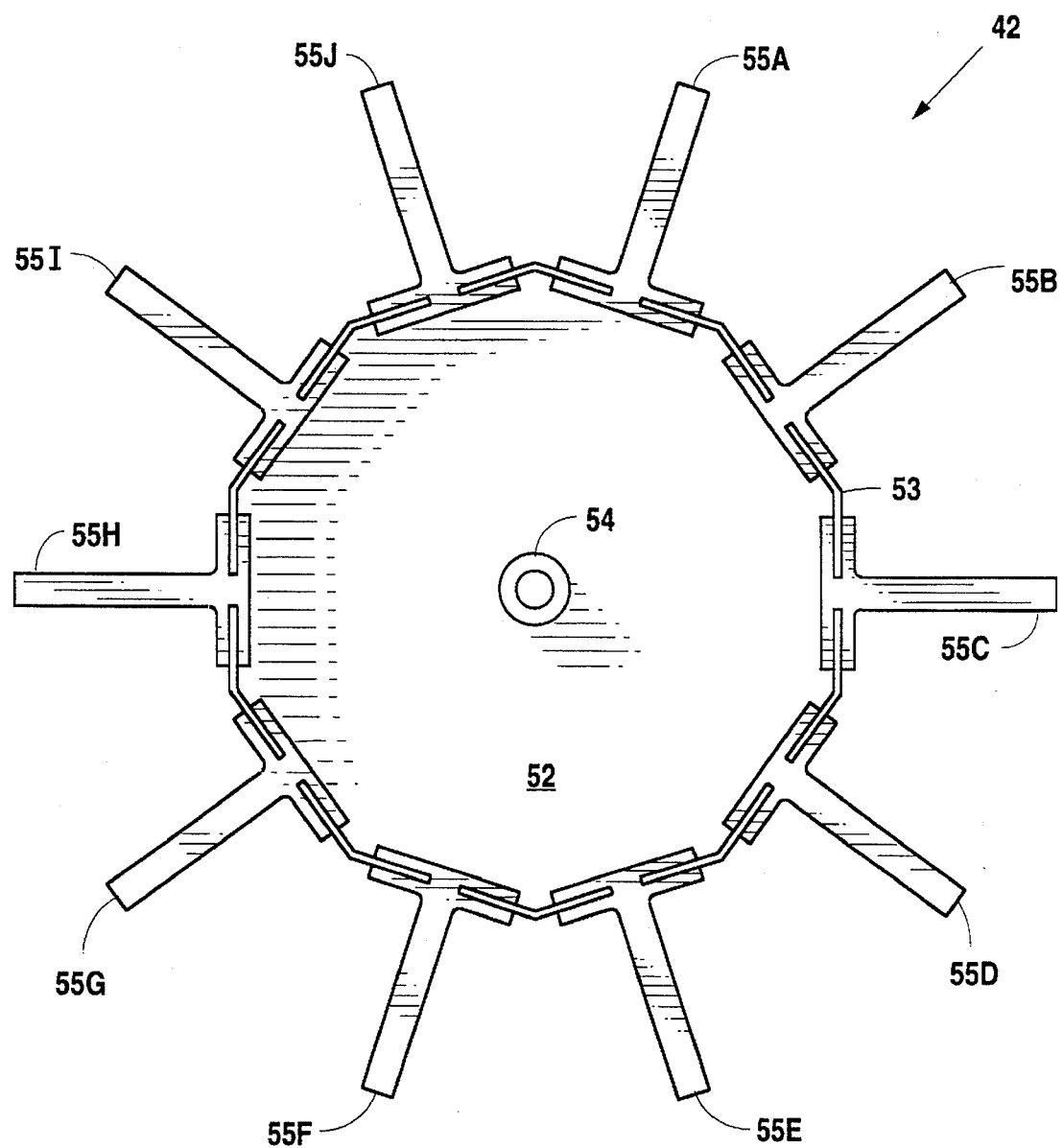
FIG. 5 is a front plan view illustrating the dispensing wheel.

Wheel 42 includes disk 52 and annular flange 53 extending therefrom. Disk 52 includes grommet 54 formed integrally therewith to support shaft 27 of gear motor 26 which passes through opening 48B of depression 48A. Shaft 27 is coupled to grommet 54 to permit the rotary driving of wheel 42 (described herein). Wheel 42 includes paddles 55A–J to facilitate the delivery of ice to chute 45. Paddles 55A–J may be of any suitable material such as rubber, plastic, metal, etc. Paddles 55A–J fit into slots about annular flange 53 and are held in place by friction or a suitable adhesive (see FIG. 5). Alternatively, disk 52, annular flange 53, and paddles 55A–J may be molded as a single piece using any suitable material such as plastic, metal, etc. to form wheel As illustrated in FIGS. 4 and 7, dispensing apparatus 10 includes agitator 58 that prevents ice within dispensing apparatus 10 from freezing together. One end of agitator 58 fits within the grommet 54 of disk 52 and is secured to shaft 27 of gear motor 26 using agitator pin 59. Agitator pin 59 passes through aligned openings in grommet 54, shaft 27, and agitator 58 to couple both wheel 42 and agitator 58 to shaft 27. The opposite end of agitator 58 fits within bushing 60 to permit the rotation of agitator 58 within liner 11.

Wrapper 61 fits about liner 11 and connects to mounting plate 13 using any suitable means such as screws or nuts and bolts. An insulating foam is sprayed between liner 11, mounting plate 13, and wrapper 61 and to form an insulated water-tight bin 62 for storing ice. Merchandiser 63 attaches to mounting plate 13 above dispensing valves 41 using any suitable means such as screws or nuts and bolts. Dispensing apparatus 10 includes merchandiser 63 to provide an aesthetically pleasing appearance as well as furnish a frame for displaying advertising material. Additionally, lid 65 fits on top of wrapper 61 to provide a cover for bin 62.

Figure 6:
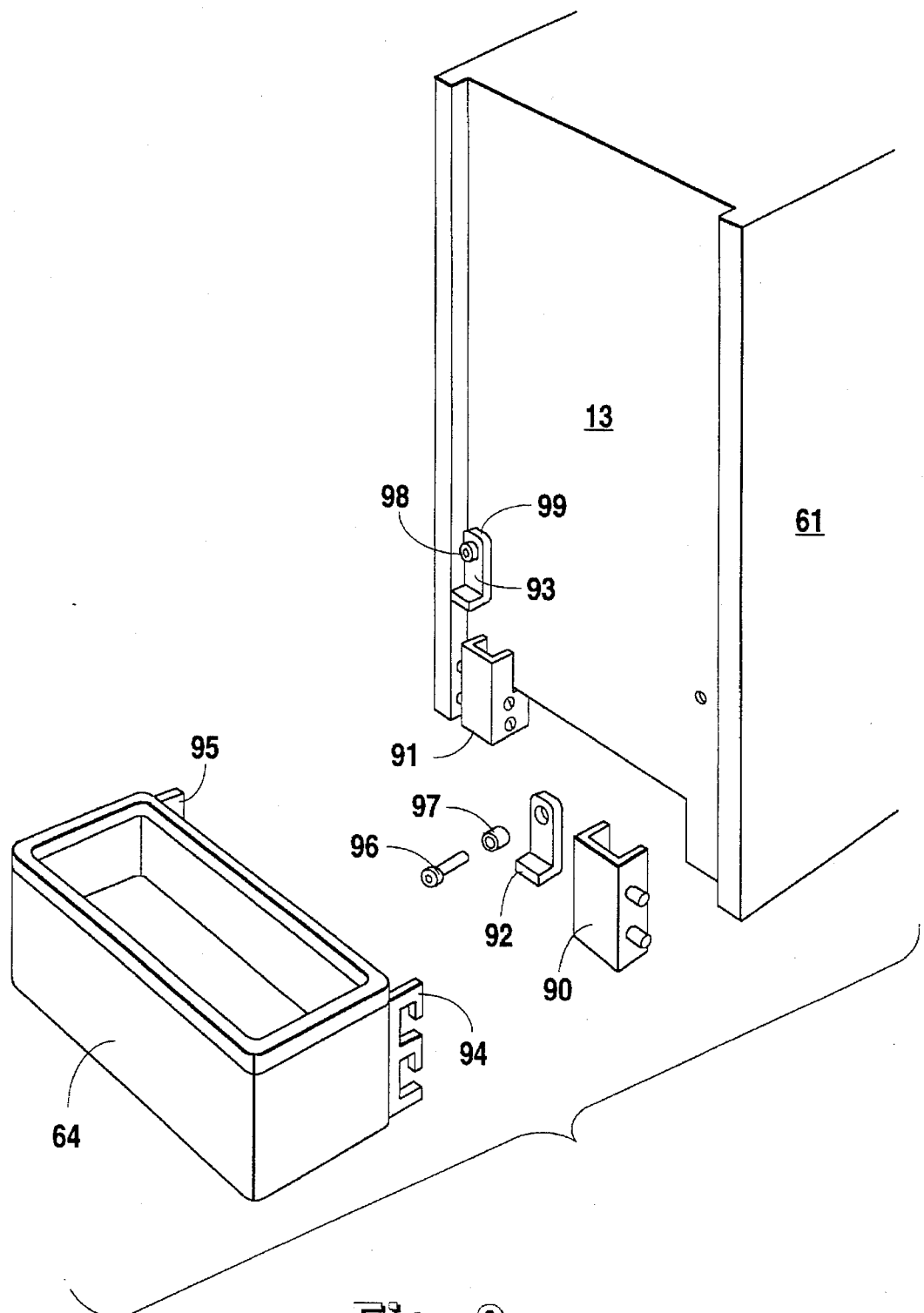
FIG. 6 is a perspective view illustrating the mounting of the drip tray onto either the ice dispenser or combination ice and beverage dispenser.

As illustrated in FIG. 6, mounts 90 and 91 and locks 92 93 permit the attachment of drip tray 64 in front of mounting plate 13 below dispensing valves 41. Drip tray 64 collects spilled product and delivers it to a drain to prevent product from accumulating about dispensing apparatus 10. Drip tray 64 includes brackets 95 and 95 that have a pair of hooks, while mounts 90 and 91 are substantially U-shaped and include pins that support the hooks of brackets 94 and 95. Mounts 90 and 91 attach to base 12 using any suitable means such as screws. Locks 92 and 93 are substantially L-shaped and attach to mounting plate 13 using respective screws 96 and 98 and bearings 97 and 99. Bearings 97 and 99 allow their respective locks 92 and 93 90 and 91.

To attach drip tray 64, locks 92 and 93 are first swivelled away from mounts 90 and 91, respectively. Brackets 94 and 95 are then placed onto the pins of a respective mount 90 and 91 to support drip tray 64 in front of mounting plate 13. After the placement of drip tray 64 onto mounts 90 and 91, locks 92 and 93 are swivelled over mounts 90 and 91, respectively, such that they lock brackets 94 and 95, respectively, onto mounts 90 and 91 to prevent accidental dislodgement of drip tray 64 from brackets 94 and 95.

In operation, lid 65 is removed and bin 62 filled with ice manually using tray 24 as a platform to permit the dumping of ice into bin 62 from a suitable ice container. Alternatively, lid 65 may be removed and an ice making machine mounted onto dispensing apparatus 10 such that the ice machine directly communicates ice into bin 62 in response to control signals generated by ice level sensors positioned within bin 62. When an ice maker is placed over bin 62, tray 24 permits the manual dumping of ice into bin 62 if the ice maker malfunctions or cannot replenish ice quickly enough to meet customer demand.

Once ice resides within bin 62, ice dispensing may begin. The angular positions of cold plate 18 and shroud 43 within bin 62 direct ice onto curved plate 51 of shroud 43. Curved plate 51 directs the ice into the lower section of cylindrical portion 44 of shroud 43. The placement of wheel 42 in the recess defined by cylindrical portion 44 creates pockets that facilitate the lifting of ice to chute 45. Specifically, adjacent ones of paddles 55A–J, annular flange 53, and the inner surface of cylindrical portion 44 of defining the recess in which wheel 42 resides produce pockets.

To activate wheel 42 and dispense ice, a user pushes lever 38 toward splash plate 39, typically with a cup. The pushing of lever 38 causes tube chute 35 to pivot toward splash plate 39 and away from switch 36. As tube chute 35 pivots away, protrusion 35A releases contactor 36A, resulting in the activation of switch 36. The activation of switch 36 permit the actuation of solenoid 32 and gear motor 26. Once activated solenoid 32 opens door 31 via lever 33 to permit the discharge of ice through chute 34 and tube chute 35 into the cup below.

Once actuated, gear motor 26 rotates wheel 42 within shroud 43 to lift ice to chute 45. Curved plate 51 directs ice into the pockets defined by wheel 42 and shroud 43 so that, as wheel 42 rotates, it lifts ice to chute 45 of shroud 43. Additionally, a portion of the ice exits shroud 43 at openings 46 and 47 to fill the front portion of bin 62 with ice. The ice within bin 62 not only provides ice for beverages but also cools beverages flowing through cold plate 18. Accordingly, ice must reside on the maximum amount of cold plate surface area to ensure beverages are dispensed at a minimum temperature. Thus, ice exiting shroud 43 via openings 46 and 47 drops in front of and onto the forward portion of cold plate 18.

As the ice reaches chute 45, it passes through chute 45 into chute 34 and then down tube chute 35 into the cup below. As long as the user presses lever 38, gear motor 26 rotates wheel 42 to facilitate the delivery of ice. However, once lever 38 is released, spring 37 pulls tube chute 35 back to its unpivoted position. As a result, protrusion 35A depresses contactor 36A to deactivate switch 36 and thus solenoid 32 and gear motor 26. With gear motor 26 deactivated, dispensing wheel 42 stops rotating to end the delivery of ice. Furthermore, the deactuation of solenoid 32 allows door 31 to close which prevents ice flow through chute 34 into tube chute 35.

In addition to rotating wheel 42, gear motor 26 rotates agitator 58. Agitator 58 travels circularly through the ice within bin 62 to break apart any ice chunks that have frozen together. Accordingly, agitator 58 ensures the ice within bin 62 remains small enough to fit within the pockets defined by wheel 42 and shroud 43. Furthermore, dispensing apparatus 10 includes a timer that periodically actuates gear motor 26 to facilitate the rotation of wheel 42 and agitator 58. However, the timer does not actuate solenoid 32 so that door 31 remains closed. Consequently, wheel 42 rotates to deliver ice at the front of bin 62 via openings 46 and 47, while agitator 58 rotates to prevent ice within bin 62 from freezing together.

For the combination ice and beverage dispenser, a user may dispense a beverage after receiving a cup of ice. The user depresses a lever of one of dispensing valves 41 which opens to permit beverage to flow from cold plate 18 into the cup via the opened dispensing valve. The dispensed product may be any suitable beverage such as a fruit drink or carbonated soda water formed by mixing a beverage syrup with water or carbonated water at dispensing valves 41. Consequently, cold plate 18 connects to any suitable remote beverage source such as a bag in a box or "figal" along with a carbonated water and plain water source.

Although the present invention has been described in terms of the foregoing embodiment, such description has been for exemplary purposes only and, as will be apparent to one of ordinary skill in the art, many alternatives, equivalents, and variations of varying degrees will fall within the scope of the present invention. That scope, accordingly, is not to be limited any in respect by the foregoing description, rather, it is defined only by the claims which follow.

I claim:

1. An apparatus attaching a drip tray to a beverage dispenser, comprising:

said beverage dispenser;

said drip tray;

first and second mounts secured to said beverage dispenser for supporting said drip tray;

first and second brackets secured to said drip tray and positionable on said first and second mounts, respectively; and first and second locks pivotably secured to said beverage dispenser and movable between a position that releases said drip tray and a position that locks said drip tray on said first and second mounts.

2. The apparatus according to claim 1 wherein said first and second mounts each are substantially U-shaped and each include at least one pin.

3. The apparatus according to claim 2 wherein said first and second brackets each include at least one hook positionable respectively on each of said at least one pin of said first and second mounts.

4. The apparatus according to claim 3 wherein said first and second locks are substantially L-shaped.

5. An apparatus attaching a drip tray to a beverage dispenser, comprising:

first and second mounts secured to the beverage dispenser for supporting the drip tray, wherein said first and second mounts are substantially U-shaped and each include at least one pin;

first and second brackets secured to the drip tray and positionable on said first and second mounts, respectively, wherein said first and second brackets each include at least one hook positionable on each of said at least one pin; and first and second L-shaped locks pivotably secured to the beverage dispenser and movable between a position that releases the drip tray and a position that locks the drip tray on said first and second mounts.

* * * * *